Oct. 6, 1970     D. E. CZERNIK     3,532,349

NO RETORQUE CYLINDER HEAD GASKET

Filed Dec. 1, 1966     3 Sheets-Sheet 1

Inventor:
Daniel E. Czernik,
By George H. Simmons
atty.

Oct. 6, 1970  D. E. CZERNIK  3,532,349
NO RETORQUE CYLINDER HEAD GASKET
Filed Dec. 1, 1966  3 Sheets-Sheet 2
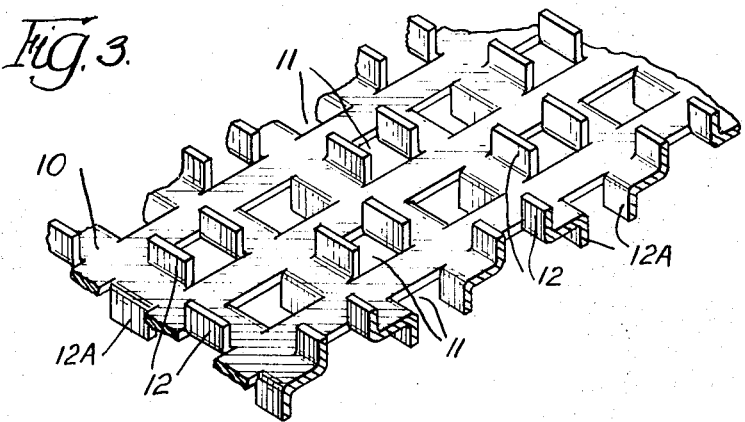
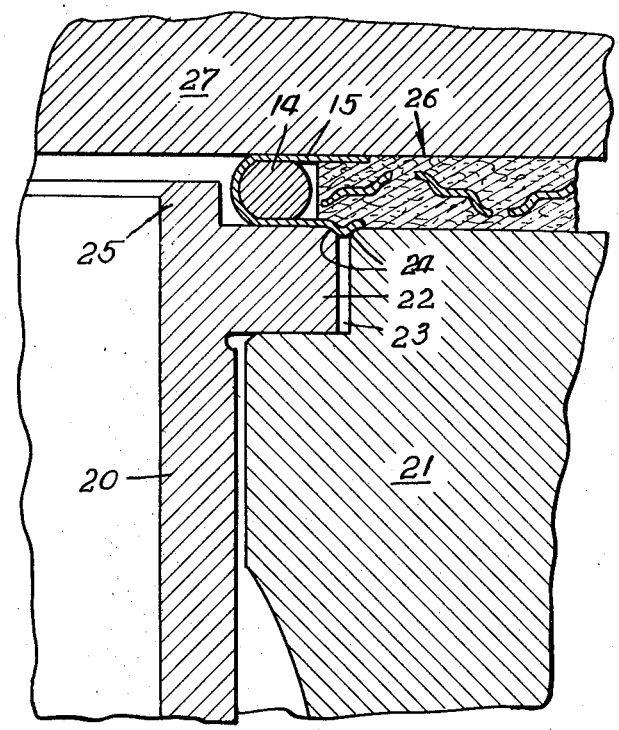
Inventor:
Daniel E. Czernik
By George H. Simmons
atty.

Inventor:
Daniel E. Czernik,
By George H. Simmons
atty

United States Patent Office 3,532,349
Patented Oct. 6, 1970

3,532,349
NO RETORQUE CYLINDER HEAD GASKET
Daniel E. Czernik, Hinsdale, Ill., assignor, by mesne assignments, to Dana Corporation, Toledo, Ohio, a corporation of Virginia
Filed Dec. 1, 1966, Ser. No. 589,434
Int. Cl. F16j 15/02
U.S. Cl. 277—206
6 Claims

ABSTRACT OF THE DISCLOSURE

This application discloses a cylinder head gasket for sealing the cylinder head on the block of a high compression ratio internal combustion engine. The gasket contains fire rings for sealing the combustion chamber gases and a body for sealing fluids in the engine, which body is composed of compressible material which when clamped between the head and block of the engine is compressed sufficiently to have relaxation so low that the loss of torque on the clamping bolts remains below 10% and retorquing of the engine is not required.

---

It is a main object of the invention to provide a cylinder head gasket for use in heavy duty naturally aspirated and turbo charged diesel engines as well as high compression gasoline engines, which gasket has relaxation so low that retorquing of the studs or bolts which clamp the cylinder head onto the block of the engine is not necessary.

Cylinder head gaskets which have been heretofore used to effect a seal between the cylinder head and the block of an internal combustion engine, having a high compression ratio, when compressed by the torque on the studs or bolts to the working thickness specified by the engine manufacturer, have had relaxation so high that retorquing becomes necessary in order to provide sealing conditions as the engine operates. In most instances, whenever the torque loss equals or exceeds 10%, retorquing is required.

As used herein relaxation is defined as a reduction of stress in a specimen while under constant strain.

Application of a force compressing a gasket builds up in the gasket material a compressive stress which is proportional to the applied force. It is known that responsive to the continued application of such force, the stress in the material tends to decrease, and relaxation of the gasket results. Relaxation of the gasket material results in loss of torque on the cylinder head studs or bolts.

Prior art cylinder head gaskets, of which I am aware, in certain instances have been of sandwich type construction consisting of a middle layer of asbestos material with top and bottom metal layers. In other instances, a perforated or an imperforate metallic core has been faced on both sides with an asbestos material containing a binder of either elastomeric material or a bituminous material. Gaskets of this latter type have included metal flanges surrounding each combustion chamber opening in the gasket or have metal grommets in the gasket bodies to seal the fluid openings in the engine. Use of either one of the above types of gaskets has usually required retorquing since the relaxation of the gasket material produces a torque loss in excess of the allowable 10%. In certain instances, a metal or metal-asbestos fire ring has been used, such rings have been installed around the cylinder openings independently of the gasket or have been incorporated in the gasket as an integral part thereof by means of metal flanges. It has been found that in such rings approximately 50% of the available force is required to compress the fire ring while the remaining 50% of this force is distributed over the gasket body area, resulting in a unit pressure on the gasket that may be insufficient to effect and maintain a seal without a retorque operation.

The present invention seeks to improve upon these prior art gaskets by providing a gasket body consisting of an improved metallic core with an elastomeric bonded inorganic fiber material clinched securely on both sides of the core, which body is equipped with a fire ring that is highly yieldable when loaded with a light force. This construction requires approximately 30% to 40% of the available force to compress the fire ring to its working thickness, leaving the remaining 60% to 70% of this force available to compress the body of the gasket. In one instance, the force available, when spread over the area of the gasket body, results in a stress of 2500 pounds per square inch on the body with the result that the body of the gasket is loaded enough to compress the material therein sufficiently that relaxation of that material produces a torque loss to less than 10%. As a result, retorquing of the engine studs or bolts is not required.

The design of "no retorque" cylinder head gaskets capable of achieving and maintaining engine requirements of performance has involved running extensive laboratory tests on various gasket body materials and on various fire ring constructions and then selecting a combination of material and fire rings which will produce the desired results. Gaskets incorporating the selected combination were tested on engines to verify the laboratory data. In this way, the engine manufacturer's performance requirements can be met.

The invention will be best understood by reference to the accompanying drawings in which a preferred embodiment of the invention is shown by way of example and in which:

FIG. 3 is a view in isometric projection of a section of core stock, drawn to an enlarged scale;

FIG. 7 is a fragmentary cross sectional view showing the preferred form of the gasket applied to a sleeved high compression ratio internal combustion engine.

Figure 1:
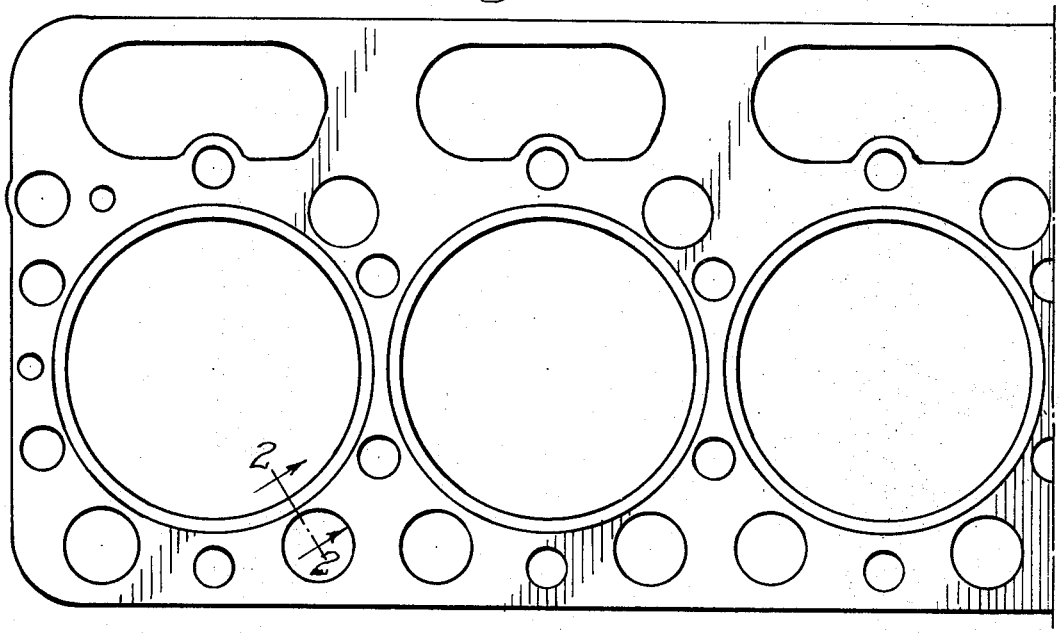
FIG. 1 is a plan view of a typical cylinder head gasket embodying the teachings of the invention.

The typical gasket shown by way of example in FIG. 1 contains the usual combustion chamber openings, bolt holes coolant openings and valve push rod openings, all of which are located and dimensioned to fit the gasket to a particular heavy duty engine. As will be seen best in FIG. 2, the gasket body consists of a metal core 10 to both faces of which elastomeric bound asbestos sheets are secured. This core is an improvement of the core shown in the John H. Victor, Pat. No. 1,911,484, issued May 30, 1933.

The core shown in said Victor patent is formed by burst piercing in a reciprocating perforating machine having pyramidal punch tips. The core contains rectangular perforations from the dedges of which triangular tangs upstand. The tangs at the sides of the perforations are smaller in height and area than the tangs at the ends thereof and the end tangs are not of the same height and area, although each is larger than the side tangs.

As will be seen best in FIG. 3, the core the present invention consists of a metal sheet 10 of suitable thickness pierced by a plurality of rectangular perforations 11 arranged in spaced apart relation in parallel rows that run longitudinally of the core. The perforations are also aligned in rows that extend transversely of the core. The sheet 10 is pierced in shear by reciprocating wedge shaped punches. This action produces upstanding tangs 12 at the opposite ends of certain ones of the perforations 11 and depending tangs 12A at the opposite ends of other perforations. Tangs 12 and 12A are rectangular in shape and are disposed substantially vertically to the plane of the sheet 10. Tangs 12 and 12A are alternated in both the longitudinal and transverse rows in the core. The sides of the perforations 11 do not contain any tangs.

The tangs at the opposite ends of a perforation have the same height and area. The area of the tangs 12 and 12A is greater than the area of the tangs in the above Victor patent even though the heights of the tangs be the same. Thus the core of the present invention possesses definite advantages.

When a facing material, particularly an elastomeric bound facing material, is attached to the core of the present invention, the rectangular tangs, on being forced into the material, engage a larger area of material than would be possible with a triagular tang of the same height. The rectangular tangs, being stronger than triangular tangs, clinch the material firmly to the core.

It has been found that when an elastomeric bound asbestos fiber facing sheet is attached to the core of the above Victor patent, the sheet is not secured to the core sufficiently to permit cutting a gasket from the material. During cutting, the facing material separates from the core. With the core of the present invention, there is no separation when gaskets are cut from the material.

Figure 2:
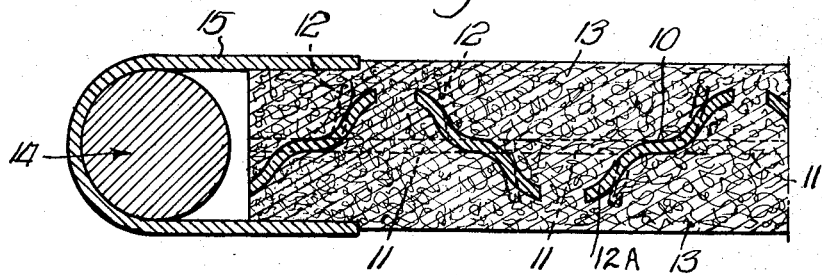
FIG. 2 is a fragmentary cross sectional view taken along line 2—2 of FIG. 1 looking in the direction of the arrows and drawn to an enlarged scale.

As will be seen in FIG. 2, fixed upon the upper and lower faces of the core are facing sheets 13 which, in the example shown, consist of an inorganic fibrous material containing an elastomeric binder that is impervious to the liquids to be sealed by the gasket. Preferably the facing material in facing sheets is one that shows low compression at high loadings and in which the rate of increase in compression decreases as the loading on the material increases.

The facing material sheets consisting of elastomeric bound asbestos in the example shown, are attached to the core by the application of pressure and/or heat and pressure, such as by calendering rolls, and this application of pressure embeds the tangs 12 and 12A into the facing material and moves tangs from the position shown in dotted lines in FIG. 2 to the position shown in full lines therein thus clinching the material securely on the core. This movement of the tangs towards the center of the perforations, out of which they were struck during the formation of the core stock, results in the production of a gasket material that has but a single thickness of metal throughout its entire area with the exception of small areas, at the approximate centers of the perforations 11 in the core, in which no metal is disposed between the two layers of material. This contrasts with prior art asbestos faced cores wherein the tangs that secure the facings onto the core have been bent outwardly producing regions containing two thicknesses of metal, and areas in which there is no metal between the two layers of material. As a result of this prior art practice, the gasket material does not have desired uniformity such as is achieved in the construction of this invention.

Each combustion chamber opening in the gasket is equipped with a fire ring 14 preferably composed of an annealed low carbon content steel wire which is highly compressible at low loadings and which has low elasticity. The fire ring 14 is secured in the gasket body by a flange or grommet 15 which encircles the ring and engages both faces of the gasket body. As will be seen in FIG. 2, the flange 15, in free state, although indented into the facing material 13 nevertheless extends beyond the surface of that material oftentimes as much as 5 mils on each side of the gasket. Preferably the flange 15 is composed of stainless steel or other high alloy material which is harder than the material in the fire ring 14.

Figure 4:
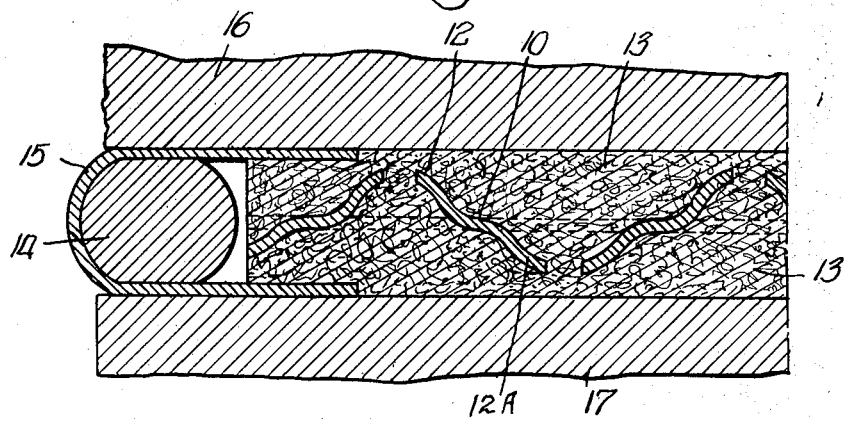
FIG. 4 is a view similar to FIG. 2 showing the gasket compressed between the head and block of an engine.

When the cylinder head 16 is clamped onto the gasket and the gasket to the engine block 17 with the torque on the engine head studs or bolts specified by the manufacturer of the engine, the gasket body and fire ring are compressed into the specified working thickness as shown in FIG. 4. It will be apparent that since flange 15 extends over the top and bottom surfaces of the gasket body which it engages, the flanges and fire ring will be compressed more than the gasket body but will attain essentially the same compressed thickness when the cylinder head is clamped into working position.

Engineering tests have shown that the combustion gases in the combustion chamber of a turbo-charged heavy duty diesel engine can be successfully sealed with a load of 2000 pounds per linear inch on the fire ring and that in a gasoline engine a load of 1500 pounds per linear inch of fire ring is required.

In order to determine the kind of wire best suited for use in the fire ring, numerous tests were run on various kinds of wire. In these tests, a sample of wire of known length was loaded by various pressures and the amounts of compression resulting from these loadings were accurately measured. The amount of recovery of the samples upon removal of the loads was also measured.

Figure 5:
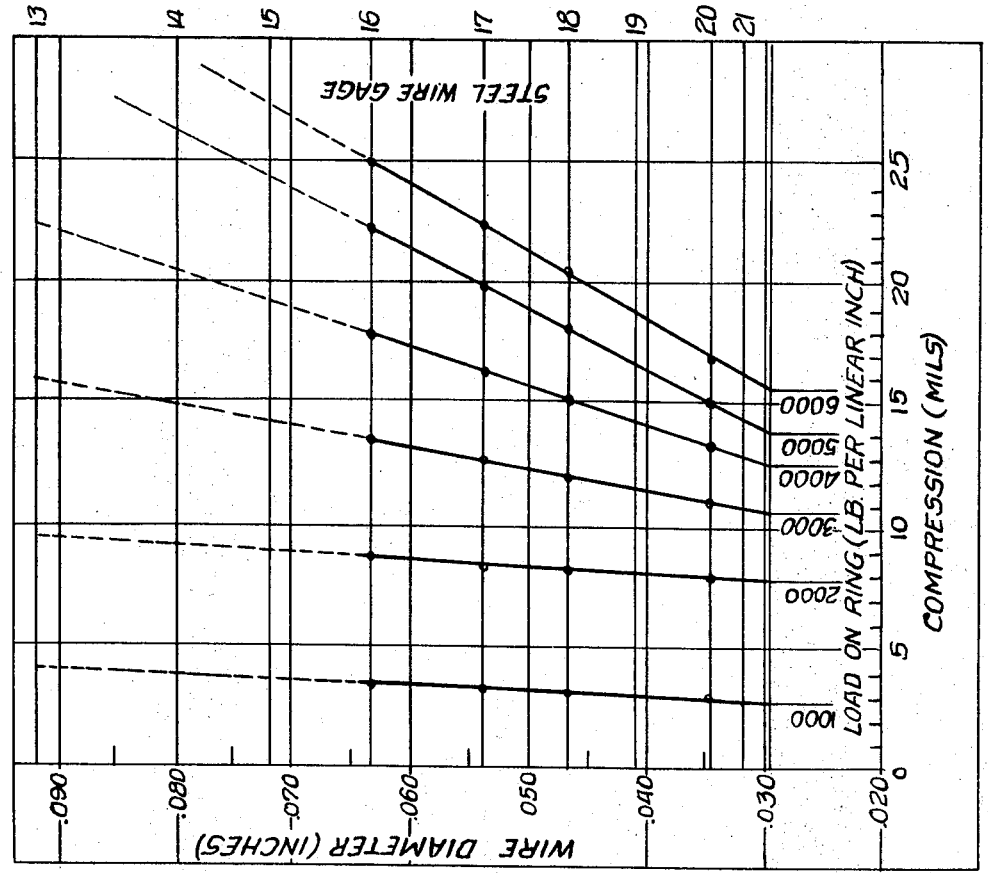
FIG. 5 is a graph showing the compression of various fire ring wires at specified loadings per linear inch of wire.

As a result of these tests, a bright basic annealed steel wire, meeting SAE-1010 specification was selected as suitable for the intended use. As will be seen in FIG. 5, when a load of 1000 pounds per linear inch was applied to a #17 gauge sample, a compression of 3.2 mils resulted. When this load was increased from 1000 to 2000 pounds, compression was increased by 4.8 mils to a total compression of 8.0 mils. When the load was increased from 2000 to 3000 pounds, compression was again increased by 4.8 mils. Increasing the pressure above 3000 pounds resulted in a decrease in the rate of compression and as the load was increased from 5000 to 6000 pounds, an increase in compression of only 2.6 mils resulted. This wire is basically inelastic and upon removal of load from the sample recovery of only 1 mil was noted. FIG. 5 shows the results of tests run on samples of this wire of various gauges.

The gauge of a wire to be used in a particular gasket will depend upon the predetermined compressed thickness of the gasket, the compressive characteristics of elastomeric bound asbestos material in the body of the gasket, and the portion of the available load to be utilized to compress the fire ring to working thickness. In the gasket shown by way of example, the free state thickness of the gasket body is in the range of .060 to .065 inch and a 17 gauge wire having a diameter of .054 inch was chosen as the material for the fire rings 14. To secure the fire ring 14 in the gasket body, a stainless steel flange 15 having thickness of .007 inch is used and, as will be seen in FIG. 2, the upper and lower faces of this flange are disposed above and below the corresponding faces of the gasket body approximately .005 inch on each side of the body when that body is in free state.

Tests have shown that when the hardness of the material in the flange 15 is approximately the same as the hardness of the metal in the ring 14, static and dynamic loading resulting from operation of an engine, may result in Brinelling of the ring into the flange sufficiently to cause cracking of the flange and consequent failure of the assembly. When the flange is composed of metal harder than that in the ring, brinelling decreases. The greater the differential in hardness, the smaller the brinelling. A flange composed of dead soft tin plated steel, when used with a ring of the preferred metal failed after a short run. By using a flange composed of a high strength metal such as a high alloy stainless steel, for example, brinelling is reduced sufficiently that failure of the flange section of the fire ring is eliminated.

When the fire ring in the gasket shown by way of example is loaded to 2000 pounds per linear inch of fire ring, since the circumference of the fire ring is approximately 15 inches, approximately 30,000 pounds of load is applied to the entire ring. When torque on the engine head studs or bolts is applied to the manufacturer's specification, it is calculated that approximately 80,000 pounds per cylinder are available to compress the gasket. Since approximately 30,000 pounds are required to compress the fire ring, approximately 50,000 pounds of the available load is applied to compress the gasket body. This force, spread over the area of the gasket body, is calculated to result in a unit pressure of approximately 2500 pounds per square inch. This 2500 pounds per square inch is in excess of the minimum of 1500 pounds per square inch which tests have shown to be necessary to properly seal the liquids to be sealed by the gasket body.

In order to insure that the material used in the gasket body will be compressed to the working thickness specified by the engine manufacturer under a load of 2500 p.s.i. and will have relaxation low enough to keep the torque loss below the allowable limit, numerous engineering tests on various materials were run. Elastomeric bound fiber asbestos materials are preferred since elastomers are impervious to the oils and coolants encountered. This property of the material eliminates the need of fluid sealing grommets in the gasket.

These tests show that the amount of compression at a given load is controlled by two factors; namely the thickness of the material and the percentage of elastomeric binder in the material. The tests also show that the greater the compression, the greater the relaxation of the material. Since the material is only slightly compressible, an application of compressive force results in an internal movement into any interstices that may be in the material and also in a bulging movement, at right angles to the direction of the applied force, around the perimeter of the material and into any perforations which it contains.

It will be readily apparent that with a given load impressed upon a gasket the amount of bulging will increase as the thickness of the gasketing material increases, and that the bulging in a gasket in which a metallic core is interposed between layers of gasketing material which is fixed to the core, will be less than that of a single layer of material the thickness of which is the same as the overall thickness of the cored gasket.

As a result of these tests, asbestos fiber bonded with polychloroprene, butadiene, butadiene-styrene, butadiene-acrylonitrile, polyacrylics, fluorocarbons, siloxanes, ethylene propylenes, ethylene propylene terpolymers, chlorosulfonated polyethylenes, isoprenes and natural rubber, either alone or in combination, have been found satisfactory as sheets for facings on the core of the present invention when the percentage of elastomeric material is in the range of 10% to 20% of the material. Of the above elastomeric materials polychloroprene is preferred. Since relaxation increases with an increase in the percentage of elastomeric material, it is preferable that this percentage be kept at or near the lower limit of said range. These tests also indicate that a free state thickness of the gasket body in the range of 60 to 65 mils will be compressed to the specified working thickness when loaded to approximately 2500 p.s.i.

Although asbestos is preferred as the fiber to be used in the gasket body, other inorganic fibers such as rock wool, glass and ceramic fibers may be used with satisfactory results. These other fibers at present are more expensive than asbestos.

Figure 6:
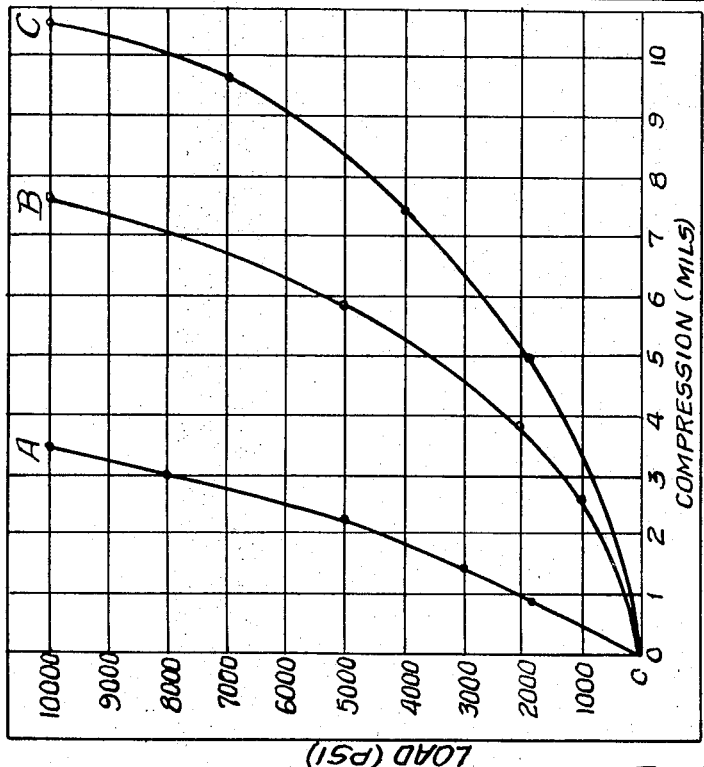
FIG. 6 are graphs showing the compression characteristics of the preferred gasketing material and of the preferred gasket.

In FIG. 6, I have shown the load compression characteristics of the gasket material and of the facing material. Curve A illustrates the characteristics of an elastomeric bound asbestos sheet of thickness in the range of 28 to 32 mils and having an elastomeric content near the lower limit of the above range. It will be noted that the slope of curve A is steep and that the curve approaches a straight line. At a loading of 2500 p.s.i. compression of 1.3 mils is shown. Curve C is of the same material as that of curve A with a free state thickness in the range of 60 to 65 mils. It will be noted that curve C is less steep and is more arcuate than curve A. At a loading of 2500 p.s.i. this sheet shows compression of 5.7 mils which is more than twice the compression of curve A due to the greater bulging of the thicker sheet.

Curve B shows the characteristics of the gasket material shown by way of example and consisting of the core of the present invention with a facing sheet on each of its faces, each of which facing sheets is the same as represented by curve A. The free state thickness of the gasket is in the range of 60 to 65 mils. It will be noted that the slope of curve B is greater than that of curve C but less than that of curve A, and that curve B is less arcuate in shape than curve C and more arcuate than curve A. The differences in shape between curve B and curves A and C is due in part to the presence of the metal core in the gasket and the absence of such a core in the samples from which curves A and C were derived. When loaded to 2500 p.s.i., the gasket is compressed 4.4 mils which unexpectedly is more than twice the compression of the single sheet of facing material. Since the compression of the two facing sheets is cumulative, compression of the gasket greater than that of a single layer of facing material is expected.

This increase in compression of the gasket when subjected to a compressive load is due to several factors. As the facing sheets are forced onto the core and secured thereto by the clinching actions of the tangs, there may be formed in the gasket a plurality of voids formed by the movement of the tangs during clinching. As compressive force is applied to the gasket, the facings are subjected to internal bulging into these voids. This movement adds to the compression of the gasket.

Also governing the compression of the gasket is a shape factor which may be expressed as the area to which the compressive force is applied divided by the perimeter area or area free to bulge. The perimeter area is the product resulting from multiplying the thickness of the material by the perimeter of the compressed area. The perimeter of the area under compression includes in addition to the perimeter of the gasket, the sum of the perimeters of the various openings into which the facing material bulges as a result of the application of compressive force to the gasket.

Curve B shows that the gasket has a maximum compression ratio at low loading and when loaded to approximately 2500 p.s.i. the gasket has been found to be compressed sufficiently so that any relaxation of the stress in the gasket body will be small and will produce only a low torque loss.

FIG. 4 shows the gasket of the present invention installed between the head and block of an engine in which the gasket engaging surfaces on the head and block are planar. This condition is found in most gasoline engines. Certain heavy duty engines, particularly diesel engines, employ sleeves in the engine block to form the cylinders therein.

In FIG. 7 I have shown the gasket of the present invention installed between the head and block of a sleeved engine. The sleeve 20 is supported in the block 21 by a flange 22 which rests on the bottom of a counterbore 23 in the block. It will be observed that the top surface of the flange 22 is disposed slightly above the upper surface or deck of the block 21, and that there are chamfers sleeve extends above the upper surface of the flange.

The gasket, indicated generally at 26, rests upon the deck of the block with the fire ring 14 and flange 15 aligned with the flange 22 and spaced outwardly of the lip 25. As the cylinder head 27 is clamped onto the block, the gasket and fire ring are compressed to form a seal and a portion of the flange 15 is forced into the groove formed between the chamfers 24. It will be noted that when the cylinder head studs or bolts (not shown) are torqued to the manufacturer's specification, the lip 25 does not engage the head 27 and seal of combustion gases is formed solely by the fire ring assembly. During operation of the engine, the space between the fire ring and the lip may become filled with carbon without damaging the seal of the combustion chamber.

Heavy duty gasoline and diesel engines, the cylinder heads of which were sealed upon the egine blocks with gaskets of the present invention and with the engine head bolts torqued to the engine manufacturer's specifications, have been subjected to standard dynometer tests which they passed with a torque loss of less than 10% and, as a result, retorquing of the engines was not required.

From the foregoing it will be apparent that by combining together gasket components having previously determined load compression characteristics I have been able to produce a cylinder head gasket for gasoline and diesel engines which gasket has a torque loss so low that retorquing of the engine is not necessary.

What I claim is:

1. A no retorque cylinder head gasket containing openings required to fit it into a high compression heavy duty internal combustion engine, said gasket comprising:
   (a) a gasket body consisting of a perforated metal core with tangs extending upwardly and downwardly, a facing sheet of synthetic elastomer bound asbestos fiber composition material attached by said tangs to the opposite faces of said metal core, said body having at least one combustion opening and a maximum compression of 2.7 mils as load thereon builds up from zero to one thousand pounds per square inch, the rate of further compression of said body decreasing as the load thereon increases;
   (b) a fire ring asembly in said combustion opening of said gasket body, said fire ring assembly consisting of a soft metallic wire ring spaced radially inwardly from the combustion opening of said gasket body, and an annular U-shaped grommet encircling said wire ring, said U-shaped grommet being harder than said wire ring and having a first radially outwardly extending flange engaging a top surface of said gasket body and a second radially outwardly extending flange engaging a bottom surface of said gasket body to mount said fire ring assembly in said combustion opening and to form a unitized gasket construction which when clamped between the block and cylinder head seals both the combustion gases and fluid ducts during operation of the engine.

2. A no retorque cylinder head gasket as specified in claim 1 in which the composition material is fixed upon each face of a metallic core that contains a plurality of rectangular perforations from the ends of which rectangular tangs embedded in the material extend in arcuate paths towards the centers of the perforations to clinch the material onto the core and to reduce the areas in which there is no metal separating the layers of material on the two sides of the core.

3. A no retorque cylinder head gasket as specified in claim 2 in which the composition facing material fibers are bonded together by a binder content of approximately 10% polychloroprene.

4. A no retorque cylinder head gasket as specified in claim 3 in which the gasket body is compressed in the range of 4 to 5 mils when loaded to 2500 pounds per square inch by the clamping of the cylinder head upon the block of an engine and in which the relaxation of said material produces less than 10% loss of torque on the bolts or studs which clamp the cylinder head upon the block.

5. A no retorque cylinder head gasket as specified in claim 1 in which the fire ring is composed of annealed low carbon steel of diameter less than the free state thickness of the gasket body which ring when compressed by an applied load of 2000 pounds per linear inch of the ring is compressed 8.0 mils to maintain a seal of combustion chamber gases during the operation of the engine and recovers 1.0 mil upon removal of that load.

6. A no retorque cylinder head gasket as specified in claim 5 in which the fire ring is secured in the gasket body by flanges composed of high alloy steel the hardness of which is sufficiently greater than that of the ring to minimize Brinelling of the ring into the flange during operation of the engine.

References Cited

UNITED STATES PATENTS

| | | | |
|---|---|---|---|
| 1,819,694 | 8/1931 | Sperry | 277—235 |
| 1,911,484 | 5/1933 | Victor | 277—233 X |
| 2,079,729 | 5/1937 | Balfe | 277—233 X |
| 2,157,102 | 5/1939 | Victor et al. | 277—232 |
| 2,029,302 | 2/1936 | Balfe | 277—235 X |
| 2,992,151 | 7/1961 | Niessen | 277—235 X |

LAVERNE D. GEIGER, Primary Examiner

J. S. MEDNICK, Assistant Examiner

U.S. Cl. X.R.

277—235

UNITED STATES PATENT OFFICE
CERTIFICATE OF CORRECTION

Patent No. 3,532,349                                October 6, 1970

Daniel E. Czernik

It is certified that error appears in the above identified patent and that said Letters Patent are hereby corrected as shown below:

Column 2, line 65, "dedges" should read -- edges --. Column 3, line 47, after "moves" insert -- the --. Column 6, line 68, after "chamfers" insert -- on the flange and deck as shown at 24. A lip 25 on the --.

Signed and sealed this 6th day of April 1971.

(SEAL)
Attest:

EDWARD M. FLETCHER JR.                      WILLIAM E. SCHUYLER, JR.
Attesting Officer                              Commissioner of Patents